United States Patent
Murakami et al.

(10) Patent No.: US 7,794,889 B2
(45) Date of Patent: *Sep. 14, 2010

(54) METHOD FOR DETECTING ABNORMALITY IN FUEL CELL

(75) Inventors: Yoshikazu Murakami, Utsunomiya (JP); Junji Uehara, Utsunomiya (JP); Masanori Hayashi, Utsunomiya (JP); Hiromichi Yoshida, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/242,226

(22) Filed: Sep. 30, 2008

(65) Prior Publication Data
US 2009/0029213 A1 Jan. 29, 2009

Related U.S. Application Data

(62) Division of application No. 10/206,016, filed on Jul. 25, 2002, now Pat. No. 7,445,861.

(30) Foreign Application Priority Data
Jul. 27, 2001 (JP) ............... 2001-228556

(51) Int. Cl.
H01M 8/02 (2006.01)

(52) U.S. Cl. ............. 429/432; 429/429; 429/413; 429/443

(58) Field of Classification Search ........... None
See application file for complete search history.

(56) References Cited

U.S. PATENT DOCUMENTS

| | | | | | |
|---|---|---|---|---|---|
| 5,763,113 | A | * | 6/1998 | Meltser et al. | 429/13 |
| 6,120,925 | A | * | 9/2000 | Kawatsu et al. | 429/40 |
| 6,156,447 | A | * | 12/2000 | Bette et al. | 429/13 |
| 2002/0051899 | A1 | * | 5/2002 | Keskula et al. | 429/17 |
| 2002/0164507 | A1 | | 11/2002 | Ding et al. | |
| 2004/0121204 | A1 | * | 6/2004 | Adelman et al. | 429/22 |

FOREIGN PATENT DOCUMENTS

DE 19523260 C2 1/1998
EP 0486654 B1 12/1996

(Continued)

OTHER PUBLICATIONS

Notification of Submission of Information for Application No. 2001-228556, dated Dec. 16, 2008.

(Continued)

*Primary Examiner*—Keith Walker
(74) *Attorney, Agent, or Firm*—Lahive & Cockfield, LLP; Anthony A. Laurentano, Esq.

(57) ABSTRACT

The invention detects quickly and with high precision abnormalities in fuel cells. In a method of detecting abnormalities in a fuel cell 1 comprising a plurality of unit cells that generate power by supplying hydrogen gas to an anode and supplying air to a cathode of each unit cell, the abnormality in the fuel cell 1 is detected based on the speed of the decrease in the cell voltages after stopping the fuel cell, i.e., after stopping the supply of the reacting gases to the fuel cell.

12 Claims, 7 Drawing Sheets

FOREIGN PATENT DOCUMENTS

| | | | |
|---|---|---|---|
| EP | 0918363 | B1 | 3/2001 |
| EP | 1128456 | A2 | 8/2001 |
| JP | 6-223850 | | 8/1994 |
| JP | 2000-285945 | | 10/2000 |
| JP | 2000-513134 | | 10/2000 |
| JP | 2001-236979 | | 8/2001 |
| JP | 2002-151125 | | 5/2002 |
| WO | WO-98/24137 | | 6/1998 |

OTHER PUBLICATIONS

Japanese Office Action for Application No. 2001-228556, dated Jun. 17, 2008.

* cited by examiner

METHOD FOR DETECTING ABNORMALITY IN FUEL CELL

RELATED APPLICATIONS

This application is a Divisional application of U.S. patent application Ser. No. 10/206,016 filed Jul. 25, 2002, which claims priority to Japanese Patent Application No. 2001-228556 filed Jul. 27, 2001 in Japan. The contents of the aforementioned applications are hereby incorporated by reference.

BACKGROUND OF THE INVENTION

1. Field of the Invention

The present invention relates to a method of detecting abnormality in a fuel cell.

2. Description of the Related Art

A fuel cell mounted in a fuel cell vehicle or the like comprises a stack formed by stacking a plurality of unit cells that are respectively formed by sandwiching a solid polymer electrolyte membrane comprising a solid polymer ion exchange membrane or the like between the anode and cathode, and interposing a pair of separators on the outside thereof. In each cell, a hydrogen gas duct that supplies hydrogen gas as the fuel gas, an air duct that supplies air that includes oxygen as an oxidizing agent, and a cooling liquid duct that supplies a coolant are provided. Below, the fuel gas and the oxidizing gas are abbreviated "reacting gases". In the fuel cell, the hydrogen ions that are generated by the catalytic reaction at the anode migrate to the cathode by passing through the solid polymer catalyst membrane, and electricity is generated at the cathode due to an electro-chemical reaction with the oxygen. In addition, the heat generated during power generation is captured by a coolant in the coolant duct, and thereby the fuel cell is cooled.

In this fuel cell, as an electrolyte, this solid polymer electrolyte membrane has the function of transmitting the hydrogen ions and, as a barrier, the function of separating the hydrogen gas in the hydrogen gas duct and the oxidizing gas (air) in the air duct, and in addition, as a barrier, the separator has the function of respectively separating the hydrogen gas in the hydrogen gas duct, the oxidizing gas (air) in the air duct, and the coolant in the coolant duct. Therefore, if holes open in the solid polymer electrolyte membrane or the separators, the hydrogen in the hydrogen gas duct will leak into the air duct.

Because it is a flammable gas, when the hydrogen gas leaks into the air duct in this manner, the hydrogen gas is heated reacting with the oxygen in the air in the air passage, and there is a concern that this will be a detrimental influence on the fuel cell.

Thus, in a fuel cell, when there is a hydrogen leak caused by damage to the membrane and the like, it is necessary that this be discovered early.

Thus, conventionally, for example, in Japanese Unexamined Patent Application, First Publication, No. Hei 6-223850, a method is disclosed in which a hydrogen detector is disposed in the exhaust path of the air that is discharged from the fuel cell, and if this hydrogen detector detects hydrogen, the supply of hydrogen gas to the fuel cell is stopped.

However, in the case of the conventional method described above, because of the relation between the detection sensitivity and the detection precision of the hydrogen detector, hydrogen leakage cannot be detected unless it has become rather advanced. Thus, it is difficult to detect hydrogen leakage before it has had a detrimental influence on the fuel cell. That is, damage to the fuel cell cannot be detected early.

In addition, in the conventional method, even if it is detected that the fuel cell has been damaged, it is not possible to specify the location of the cell in the fuel cell or which cell is abnormal (damaged).

Thus, it is an object of the present invention to provide an abnormality detecting method that focuses on the influence that the leakage of the reaction gases has on the cell voltage, and can detect damage to the fuel cell early.

SUMMARY OF THE INVENTION

In order to solve the problems described above, a first aspect of the invention provides an abnormality detecting method for a fuel cell (for example, fuel cell 1 in the embodiments described below) comprising a plurality of unit cells (for example, the unit cell 55 in the embodiments described below) that generate electricity by supplying reacting gases (for example, the hydrogen gas and the air in the embodiments described below) to an anode (for example, the anode 52 in the embodiments described below) and a cathode (for example, the cathode 53 in the embodiments described below), wherein the abnormality of the fuel cell is detected after a predetermined time interval from the stoppage of the fuel cell based on the cell voltage.

When the power generation of the fuel is stopped, the supply of the reacting gases is stopped, but reacting gases may remain in the fuel cell (gas ducts), and thus, for some time after the stoppage of the fuel cell the cell voltage is maintained. If there are not abnormalities in the cells, the cell voltage after stoppage should show a predetermined behavior (voltage decrease), and in the case that there is an abnormality in the cell, the behavior of the cell voltage after stoppage will be different from the normal behavior. Therefore, it becomes possible to detect whether or not a fuel cell is abnormal based on the cell voltage after a predetermined time from the stoppage, and it becomes possible to specify the cell that is abnormal. In addition, because the abnormality is detected based on the cell voltage in a state wherein the supply of reacting gases has been stopped, the precision of the determination is high, and determining whether or not there is an abnormality can be carried out in a short time.

A second aspect of the present invention is an abnormality detecting method for a fuel cell (for example, fuel cell 1 in the embodiments described below) comprising a plurality of unit cells (for example, the unit cell 55 in the embodiments described below) that generate power by supplying reacting gases (for example, the hydrogen gas and the air in the embodiments described below) to an anode (for example, the anode 52 in the embodiments described below) and a cathode (for example, the cathode 53 in the embodiments described below), wherein abnormalities in the fuel cell are detected based on the speed of the decrease of the voltage in each cell after stopping the fuel cell.

When the power generation of the fuel cell is stopped, the supply of the reacting gases is stopped, but reacting gases may remain in the fuel cell (gas ducts), and thus, for some time after the stoppage of the fuel cell the cell voltage is maintained. If there are no abnormalities in the cells, the speed of the decrease of the voltage of each cell after stoppage should be almost identical, and in the case that there is an abnormal cell, the speed of the decrease of the voltage of the abnormal cell becomes faster than the speed of the decrease of the voltage of a normal cell. Therefore, it becomes possible to detect an abnormality in a fuel cell based on the speed of the decrease in the voltage of each cell after the stoppage of the fuel cell, and it becomes possible to specify the cell that is abnormal. In addition, because the abnormality is detected based on the speed of the decrease of the cell voltage in a state wherein the supply of the reacting gases has been stopped, the precision of the determination is high, and determining whether or not there is an abnormality can be carried out in a short time.

A third aspect of the present invention is setting the determination threshold value indicating presence or absence of an abnormality depending on the operational status of the fuel cell.

The operational status of the fuel cell before executing the abnormality detecting processing influences the behavior of the cell voltage after stoppage of the fuel cell. For example, the larger the pressure difference between the anode and cathode before stoppage, the faster the speed of the decrease of the cell voltage becomes because the leakage of the reacting gases after stoppage is fast. The higher the degree of the humidity of the reacting gases before stoppage, the faster the speed of the decrease of the cell voltage after stoppage becomes because the discharge from the cell is accelerated. Therefore, but setting the threshold value that indicates the presence or absence of an abnormality depending on the operational status of the fuel cell, the precision of the determination can be increased.

A fourth aspect of the present invention provides an abnormality detecting method for a fuel cell (for example, fuel cell 1 in the embodiments described below) providing cells (for example, the unit cell 55 in the embodiments described below) that generate power by supplying reacting gases (for example, the hydrogen gas and the air in the embodiments described below) to an anode (for example, the anode 52 in the embodiments described below) and a cathode (for example, the cathode 53 in the embodiments described below), wherein an abnormality of a fuel cell is detected based on the distribution of the voltages of each cell after stoppage of the fuel cell.

When the power generation of the fuel is stopped, the supply of the reacting gases is stopped, but reacting gases may remain in the fuel cell (gas ducts), and thus, for some time after the stoppage of the fuel cell the cell voltage is maintained. If there are no abnormalities in the cells, the speed of the decrease of each cell voltage after stoppage should be almost identical, and in the case that there is an abnormality in the cell, the cell in which the abnormality has occurred will influence the adjacent cell, and the cell voltage will show a predetermined distribution. Therefore, it becomes possible to detect whether or not a fuel cell is abnormal based the distribution of the voltages of each cell after stoppage of the fuel cell, and it becomes possible to specify the cell that is abnormal. In addition, because the abnormality is detected based on the distribution of the voltages of each cell in a state wherein the supply of the reacting gases is stopped, the precision of the determination is high, and determining whether or not there is an abnormality can be carried out in a short time.

A fifth aspect of the present invention is the invention according to the first, second, and fourth aspects, wherein before stopping the fuel cell, abnormality detection is executed in the case that the fuel cell is operating stably.

Due to having this type of structure, it is possible to prevent mistaken determinations.

A sixth aspect of the present invention is that when an abnormality is detected in the fuel cell, the operating pressure of the reacting gases during subsequent power generation is limited to a level lower than before the abnormality was detected.

Due to having this type of structure, it is possible to reduce the amount of leakage of the reacting gases during power generation the next time and after.

DESCRIPTION OF THE PREFERRED EMBODIMENTS

Below, the embodiments of the method of detecting abnormalities in a fuel cell according to the present invention will be explained with reference to FIG. 1 to FIG. 9. Moreover, the embodiments explained below are applied to a fuel cell mounted in a fuel cell vehicle.

First Embodiment

First, the first embodiment of the invention will be explained with reference to FIG. 1 to FIG. 7.

Figure 1:
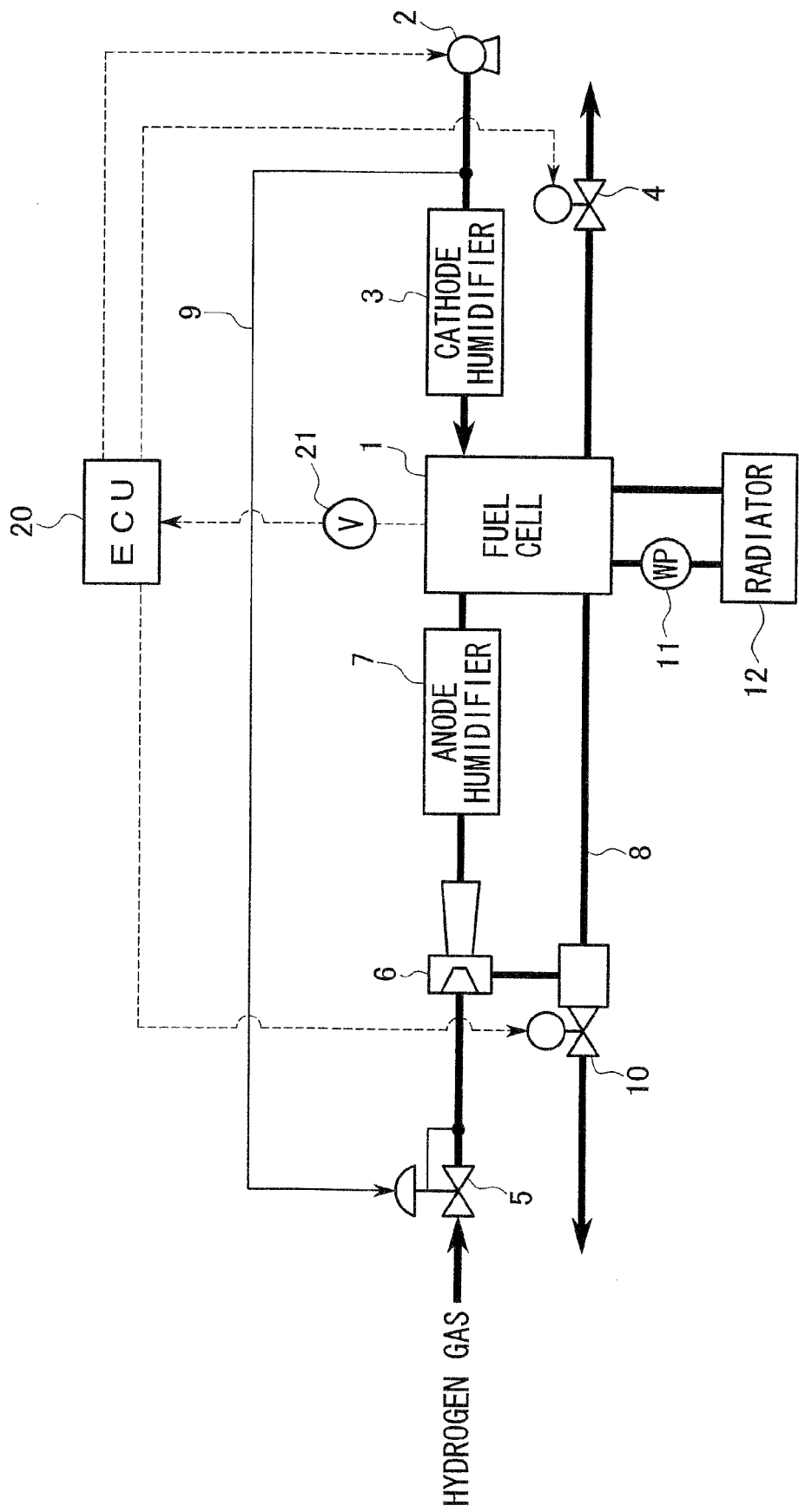
FIG. 1 is a structural diagram of the fuel cell system providing a fuel cell that detects abnormalities using the abnormality detecting method of the present invention.
Figure 2:
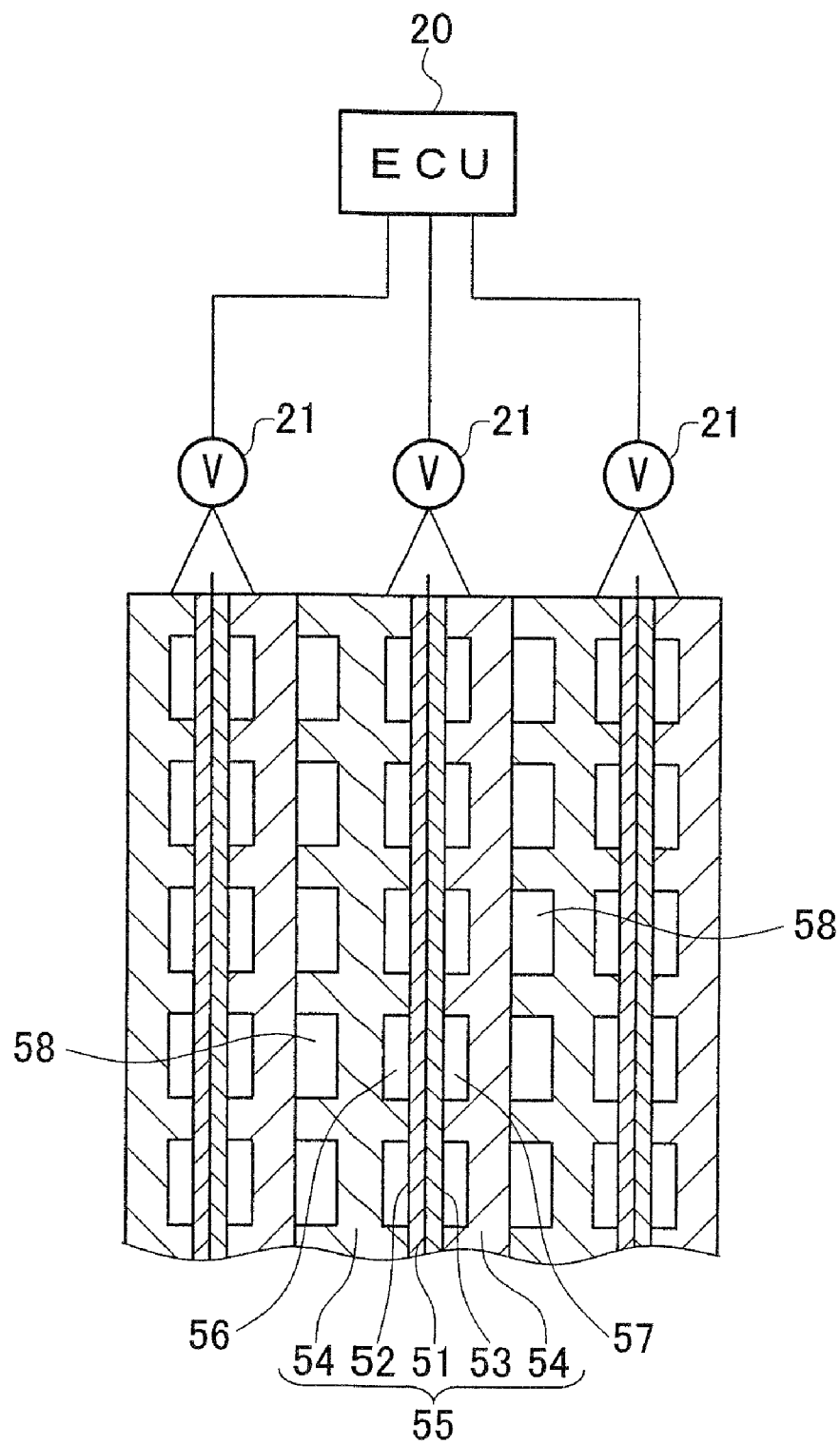
FIG. 2 is a cross-sectional diagram of the fuel cell.

FIG. 1 is a schematic structural drawing of the fuel cell system, and FIG. 2 is a drawing showing a cross-section of a part of the fuel cell 1. First, the fuel cell 1 will be explained with reference to FIG. 2. The fuel cell 1 is a fuel cell having a solid polymer electrolyte membrane, and for example, comprises stacks formed by stacking in plurality unit cells 55 formed by a solid polymer electrolyte membrane 51 comprising, for example, a solid polymer ion exchange membrane or the like being interposed between an anode 52 and a cathode 53 from both sides, and then inserting a pair of separators 54 and 54 on the outside thereof. Each unit unit cell 55 comprises a hydrogen gas duct 56 that supplies hydrogen gas (reacting gas) as a fuel gas, an air duct 57 that supplies air (reacting gas) that includes oxygen as an oxidizing gas, and a coolant duct 58 that supplies a coolant. In addition, the hydrogen ions generated by the catalytic reaction at the anode 52 migrate to the cathode by passing through the solid polymer electrolyte membrane 51, and power is generated by causing an electrochemical reaction with the oxygen at the cathode 53. The coolant duct 58 is cooled by a coolant circulating through the coolant duct 58 capturing the heat so that the fuel cell will not exceed a predetermined temperature due to the heat that accompanies power generation.

In addition, in the fuel cell 1, the voltage sensor (V) for detecting the output voltage of each of the unit cells 55 is connected to the separators 54 and 54 of each of the unit cells 55, and the output signal of the voltage sensor 21 is input into the ECU 20. Moreover, in FIG. 1, for convenience of illustration, only one voltage sensor 21 is illustrated.

Next, the fuel cell system will be explained with reference to FIG. 1. The air is compressed by an air compressor 2 and supplied to the air duct 57 of the fuel cell after being humidified by the cathode humidifier 3, and the oxygen in this air is supplied to power generation as an oxidizing agent. Subsequently, the air is eliminated as off gas from the fuel cell, and discharged to the atmosphere via the pressure control valve 4. The air compressor 2 is cycle controlled by the ECU 20 such that the amount of air supplied to the fuel cell 1 depends on the output required by the fuel cell 1. In addition, the pressure control valve 4 carries out opening control by the ECU 20 such that the pressure of the air supplied to the fuel cell 1 takes a pressure value that depends on the operational status of the fuel cell 1.

Moreover, the air supplied to the fuel cell 1 is controlled such that the larger the required power generation current of the fuel cell 1 the larger the amount of the supply of the air to the fuel cell 1, and at the same time, the air supply pressure is controlled so as to become large.

In contrast, the pressure of the hydrogen gas discharged from the high pressure hydrogen tank (not illustrated) is reduced by the fuel supply control valve 5, and then the hydrogen gas is humidified by the anode humidifier 7 and supplied to the hydrogen gas duct 56 of the fuel cell 1 through the ejector 6. After this hydrogen gas has been supplied for power generation, the unreacted hydrogen gas is eliminated as hydrogen off gas from the fuel cell 1, it is sucked into the ejector 6 through the hydrogen off gas recovery path 8, mixed with hydrogen gas supplied from the high pressure hydrogen tank, and supplied again to the fuel cell 1.

Moreover, the air that has been humidified by the cathode humidifier 3 is supplied to the cathode 53 of the fuel cell 1, and the hydrogen gas that has been humidified 7 by the anode humidifier is supplied to the anode 52 of the fuel cell 1, and thereby ion conductivity of the solid polymer electrolyte membrane 51 of the fuel cell 1 is maintained in a predetermined state.

The fuel supply control valve 5 comprises, for example, a partial pressure control valve, and carries out control such that the pressure of the air supplied from the air compressor 2 is input via the air signal introduction path 9 as a signal pressure (reference pressure), and the pressure of the hydrogen gas in the fuel supply control valve 5 outlet is maintained within a predetermined pressure range depending on this signal pressure. Moreover, the air supplied to the fuel cell 1, as has been described above, is controlled such that the larger the required power generation current of the fuel cell 1 the larger the air supply pressure, and thus the hydrogen gas controlled using the air supply pressure as the reference pressure is also controlled such that the larger the required power generation current of the fuel cell, the larger the hydrogen supply pressure.

The hydrogen off gas recovery path 8 provides a purge valve 10, and the opening of the purge valve is controlled by the ECU 20 when predetermined conditions are satisfied. Water is discharged to the outside so as not to stagnate in the hydrogen gas duct 56 of the fuel cell.

In addition, the pressure of the coolant for cooling the fuel cell 1 is boosted by the water pump (WP) 11 and then supplied to the radiator 12. In the radiator 12, the coolant cools be radiating the heat to the outside, and subsequently it is supplied to the fuel cell 1, it captures the heat from the fuel cell 1 when it passes through the coolant duct 58 inside the fuel cell 1, and thereby cools the fuel cell 1. Thereby, the heated coolant again returns to the radiator 12 via the water pump 11 to be cooled.

In a fuel cell system structured in this manner, to stop power generation by the fuel cell 1, the supply of air is stopped by stopping the air compressor 2. At the same time, the supply of hydrogen gas is stopped by closing the fuel supply control valve 5. In this manner, even if the supply of the reacting gases is stopped, reacting gases may remain in the fuel cell 1 immediately after stoppage. Thus, the cell voltage is maintained for a while after the stoppage of the fuel cell. However, the hydrogen gas remaining in the hydrogen gas duct 56 leaks from the seal part between the separators 54, and is gradually expelled from the gas supply outlet and the gas discharge outlet, and the maintained voltage of the cell decreases. Therefore, when measuring the cell voltage of each of the unit cells 55 immediately after stoppage, the cell voltages gradually decrease from the cell voltage value of each of the cells detected immediately after the stoppage, and finally the cell voltages of all of the unit cells 55 falls to zero.

Here, in the case that there are abnormalities such as holes opening in the solid polymer electrolyte membrane 51 or holes opening in the separators 54 due to the deterioration of the unit cells 55 with the passage of time, because the hydrogen gas duct 56 and the air duct 57 of the unit unit cell 55 communicate via these holes, the hydrogen gas in the hydrogen gas duct 56 gradually leaks into the air duct 57 through the holes, and the difference in hydrogen concentration between the hydrogen gas duct 56 and the air duct 57 decreases more rapidly than a normal unit unit cell 55.

Figure 3:
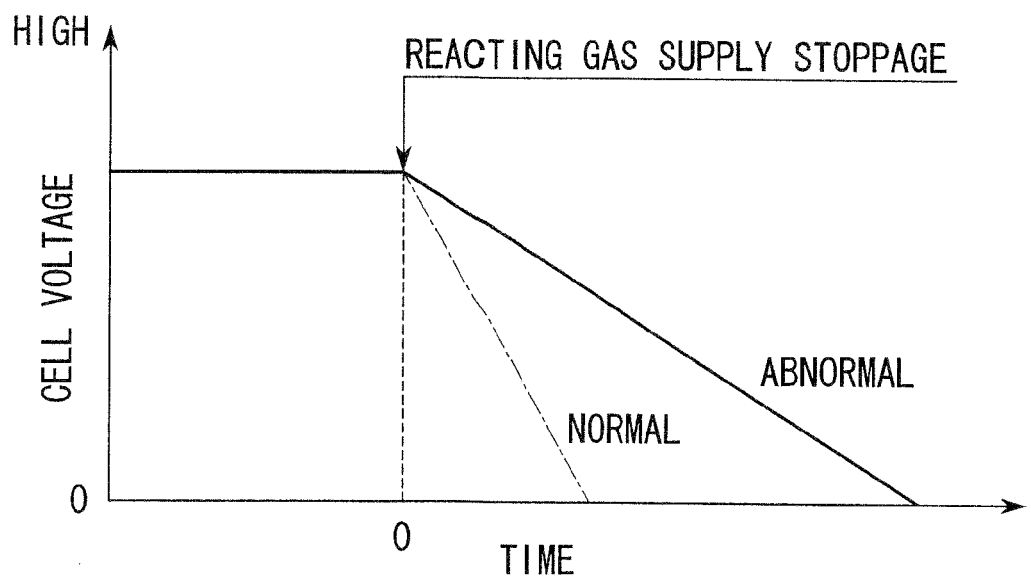
FIG. 3 is a drawing showing comparing the speed of the decrease of the cell voltage in a normal cell and an abnormal cell.

As a result, the speed of the decrease in the cell voltage in a unit unit cell 55 having an abnormality is more rapid than the decrease in the cell voltage of a normal unit unit cell 55. FIG. 3 is a comparative example of the speed of the decrease in cell voltage in an abnormal unit unit cell 55 and a normal unit cell 55. In this figure, the solid line shows the normal unit cell 55 and the dotted line shows the abnormal unit cell 55. Here, because the supply of reacting gases is stopped during the stoppage of the fuel cell 1, the difference in the speed of the decrease of the cell voltage appears conspicuously.

Therefore, the cell voltage after the passage of a predetermined time interval from the stoppage of the fuel cell 1 is lower for the cell voltage of an abnormal unit cell 55 than the cell voltage of a normal unit cell 55.

Figure 4:
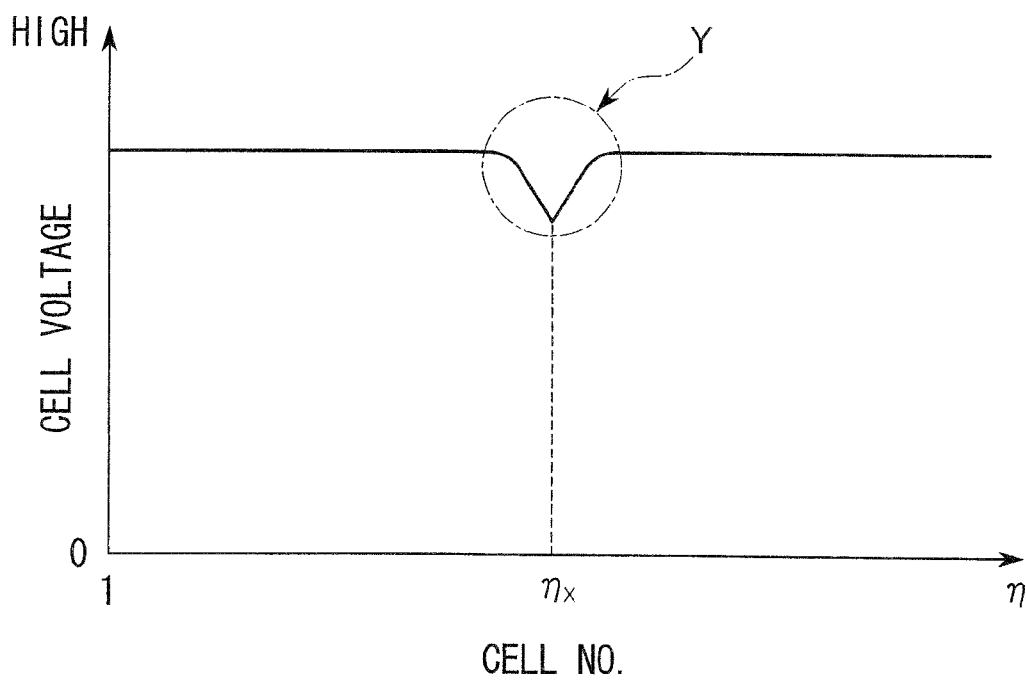
FIG. 4 is a drawing showing an example of the distribution of all cell voltages in the fuel cell.

In addition, FIG. 4 is an example of the result of measuring the cell voltage of each of the cells 55 after the passage of a predetermined time interval from the stoppage of the fuel cell 1 comprising n cells 55. The cell voltage of the $nx^{th}$ unit cell 55 that has an abnormality is the lowest, and centered on this, an approximately V shaped cell voltage distribution (below, called the "approximately V-shaped distribution part") Y is produced.

In a normal unit cell 55 and an abnormal unit cell 55, the behavior of the cell voltages after stoppage of the operation of the fuel cell 1 is different, and thus, by utilizing this behavior difference, the abnormality in the fuel cell 1 can be detected. This constitutes the abnormality detecting principle of the fuel cell of the present invention.

Figure 5:
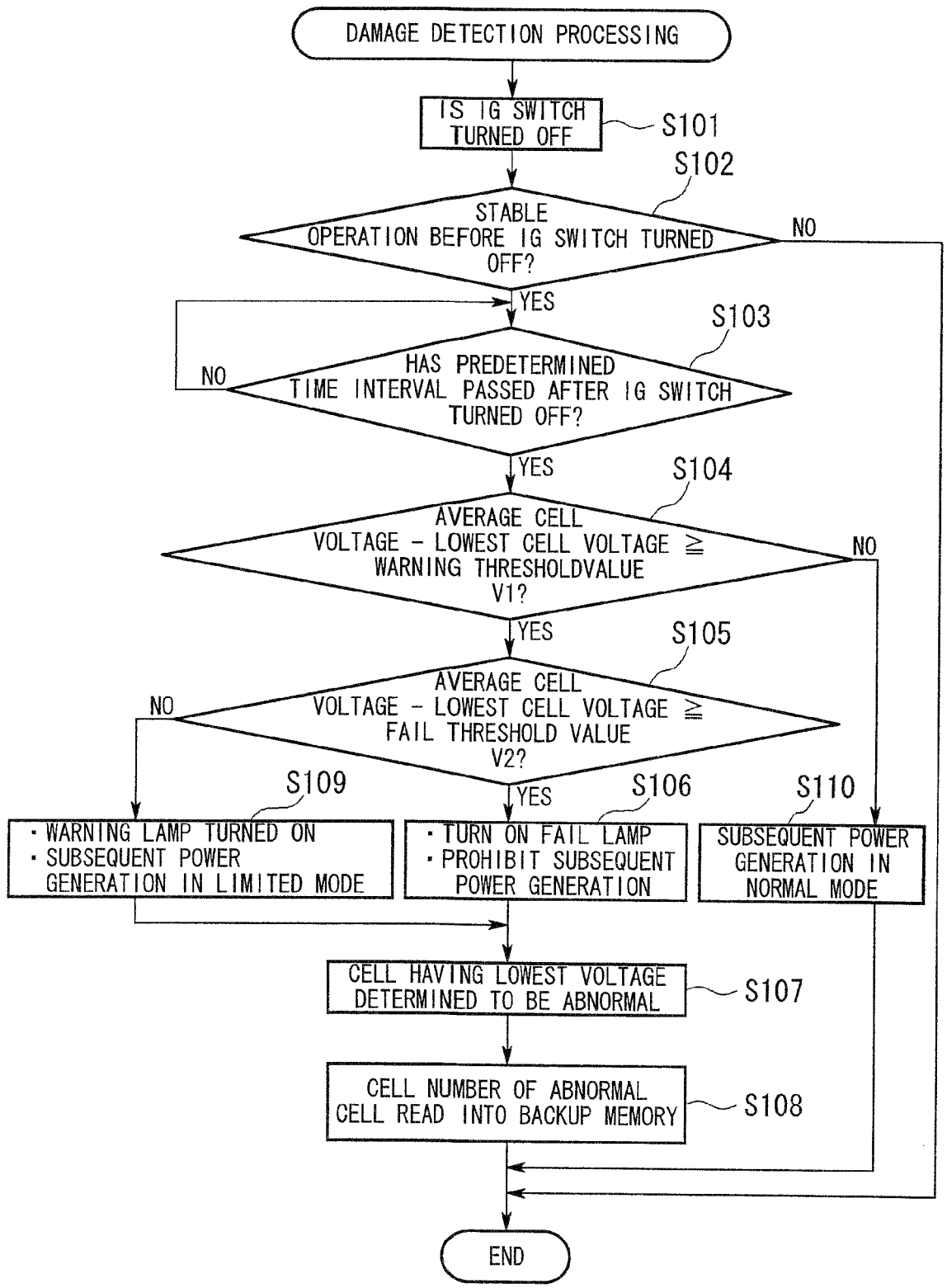
FIG. 5 is a flowchart of the abnormality detecting processing in the first embodiment of the present invention.

Next, the abnormality detection processing for the fuel cell in the first embodiment will be explained with reference to the flowchart in FIG. 5

In this embodiment, the abnormality detecting processing starts by using the OFF signal of the ignition (IG) switch as a trigger (step S 101).

In addition, in step S 102, it is determined whether or not the fuel cell 1 is stably generating power (in other words, whether or not reacting gases are being stably supplied) for a predetermined time interval or more before the ignition switch is turned OFF.

In the case that the result of the determination in step S 102 is NO (power generation is not stable before the ignition is turned OFF), the execution of the present routine is temporarily suspended. That is, in this case, the detection of abnormalities is not executed. This is because in order to detect an abnormality, if reacting gases are not stably supplied before the fuel cell 1 is stopped, correct abnormality identification cannot be carried out because the behavior of the cell voltage is unstable after stoppage. Moreover, in the case that the determination in step S 102 is NO, there are cases when, for example, the ignition switch is temporarily turned ON, but then immediately turned OFF.

Moreover, in this embodiment, the condition for starting the abnormality detection processing is based on the operation of the ignition switch being turned OFF by the user, but if the fuel cell is stably generating power, the condition for starting the abnormality detecting processing can be based on the idle stop or a forced stop in order to detect abnormalities.

In the case that the result of the determination in step S 102 is YES (power is stably generated before the ignition switch is turned OFF), the processing proceeds to step S 103, and it is determined whether or not a predetermined time interval (for example, 10 seconds) has passed after the ignition switch is turned OFF. In the case that the result of the determination in step S103 is NO, (before the passage of a predetermined time interval) the processing again returns to S 103. This is because if a predetermined time interval has not passed after turning the ignition switch OFF, the difference in cell voltages between the abnormal unit cell 55 and the normal unit cell 55 is small, and the precision of the determination deteriorates.

In the case that the result of the determination in step S 103 is YES (after the passage of a predetermined time interval), the processing proceeds to step S 104, the cell voltages of each of the cells 55 are read, the average value of the cell voltages (below, referred to as the "average cell voltage") is calculated, and it is determined whether or not the difference between the lowest cell voltage (below, referred to as the lowest cell voltage") among all cell voltages subtracted from the average cell voltage is equal to or greater than a warning threshold value $V1$.

In the case that the result of the determination in step S 104 is YES (average cell voltage−lowest cell voltage$\geq V1$), the processing proceeds to step S 105, and it is determined whether or not the difference between the average cell voltage subtracted from the lowest cell voltage is equal to or greater than a fail threshold value $V2$. Here, the fail value $V2$ is set larger than the warning threshold value ($V2 > V1$).

In the case that the result of the determination in step S 105 is YES (average cell voltage−lowest cell voltage$\geq V1$), the degree of the abnormality (deterioration and damage) is large, and thus the fail lamp is turned on, and the subsequent generation of power is prohibited (step S 106). Furthermore, it is determined that there is an abnormality (deterioration or damage) in the unit cell 55 having the cell number detected having the lowest cell voltage (step S 107), subsequently, the cell number is written into the backup memory of the ECU 20 to be referred to when the fuel cell 1 is repaired (cell exchange) (step S 108), and the abnormality detecting processing ends.

In contrast, in the case that the result of the determination is NO (average cell voltage−lowest cell voltage<$V2$), although an abnormality can be observed in the unit cell 55 with the cell number in which the lowest cell voltage has been discovered, the degree of abnormality (deterioration and damage) is small, and thus the warning light is turned on, and subsequent power generation is set to an output limited mode (step S 109). As described above, the fuel cell 1 carries out control such that the larger the required power generation current (output), the larger the hydrogen supply pressure. Thus, when the output of the fuel cell 1 is made large, the amount of hydrogen gas that leaks from the hydrogen gas duct 56 to the air duct 57 becomes large. Therefore, when a cell having an abnormality of a low degree is found, the subsequent power generation is an output limited mode, and the fuel cell 1 is operated by limiting the output of the fuel cell 1 more than when in a normal operating mode, and thereby the leakage of the hydrogen is decreased. That is, in the case that an abnormality is detected in the fuel cell 1, the operating pressure of the reacting gases during subsequent power generation is limited to a level that is lower than that before the detection of the abnormality.

Subsequently, it is determined that there is an abnormality in the unit cell 55 having the cell number in which the lowest cell voltage is detected (step S 107), the cell number is written in the backup memory of the ECU 20 (step S 108), and the abnormality detection processing ends.

In addition, in the case that the result of the determination in step S 104 is NO (average cell voltage−lowest cell voltage>$V1$), it is determined that all cells 55 are normal, subsequent power generation is set at the normal operation mode (step S 110), and the abnormality detection processing ends.

In this manner, in the first embodiment, because an abnormality in the fuel cell is detected based on the cell voltages after the passage of a predetermined time interval from the stoppage of the fuel cell 1, the abnormality in the fuel cell 1 can be detected quickly and accurately (high precision). Furthermore, the cell with the abnormality can be specified.

Moreover, in the first embodiment described above, the voltage difference between the average cell voltage and the lowest cell voltage is calculated and this voltage difference is compared with a fail threshold value $V2$ or a warning threshold value $V1$. However, instead of this, a reference variation of the cell voltages of all cells 55 can be calculated, and the abnormality determination can be carried out by comparing this reference variation to the fail threshold value $V2$ or the warning threshold value $V1$.

In addition, the operational status of the fuel cell before executing the abnormality detection processing influences the behavior of the cell voltages after stoppage of the fuel cell 1. For example, the larger the difference in pressure between the anode and cathode before the stoppage, the faster the cross-linking of the reacting gas (hydrogen gas) after stoppage, and thus the speed of the decrease in the cell voltages accelerates. The higher the humidity of the reacting gases before stoppage, the larger the amount of cross-linking between the anode and cathodes, and thus the speed of the decrease in the cell voltages after the stoppage accelerates. Therefore, when the warning threshold $V1$ and the fail threshold value $V2$, which are the determination threshold values, are set and updated depending on the operational status of the fuel cell, the precision of the determination can be increased.

Figure 6:
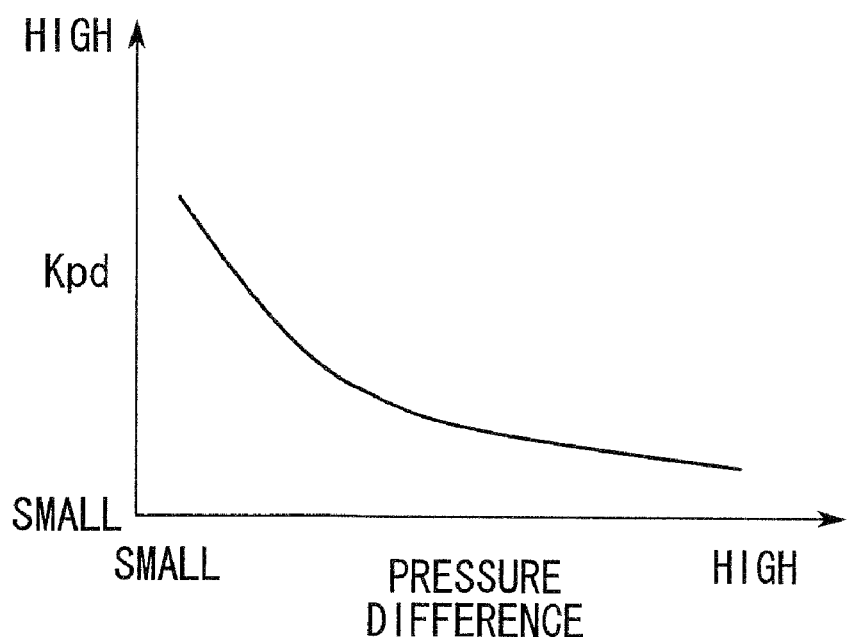
FIG. 6 is an example of a determining threshold value compensation coefficient map based on the pressure difference between the anode and the cathode.
Figure 7:
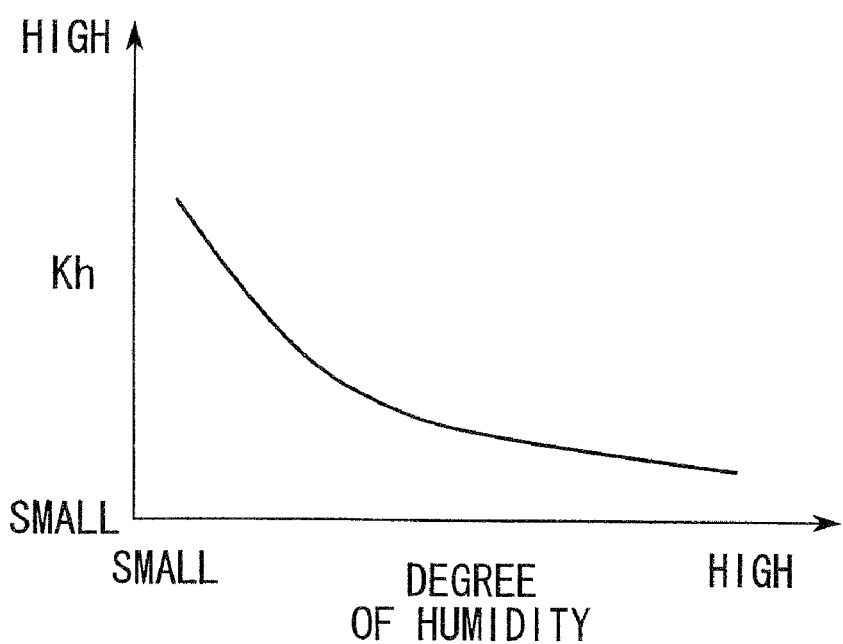
FIG. 7 is an example of a determining threshold value compensation coefficient map based on the degree of humidity of the reacting gases.

Thus, the determining threshold value compensation coefficient based on the pressure difference between the anode and the cathode and the determining threshold value compensation coefficient $Kh$ based on the humidity degree are found experimentally in advance such that the larger the pressure difference between the anode and the cathode the larger the determination threshold, and the smaller the pressure difference, the smaller the determining threshold, or the larger the humidity degree of the reacting gases the larger the determining threshold values, and the smaller the humidity degree the smaller the determining threshold value. Then, this is stored on the ROM of the ECU 20 as a determining threshold value compensation coefficient map, as is shown in FIG. 6 and FIG.

7. During the abnormality detecting processing, the determining threshold compensation coefficients Kpd and Kh are calculated depending on the operational status before stoppage of the fuel cell 1, and the fail threshold value V1 and the warning threshold value V2 are compensated based on the following equation. The compensated fail threshold value V1' and warning threshold value V2' are used in step S 104 and step S 105.

$$V1'=V1 \cdot Kpd \cdot Kh \qquad \text{Equation 1}$$

$$V2'=V2 \cdot Kpd \cdot Kh \qquad \text{Equation 2}$$

Second Embodiment

Figure 8:
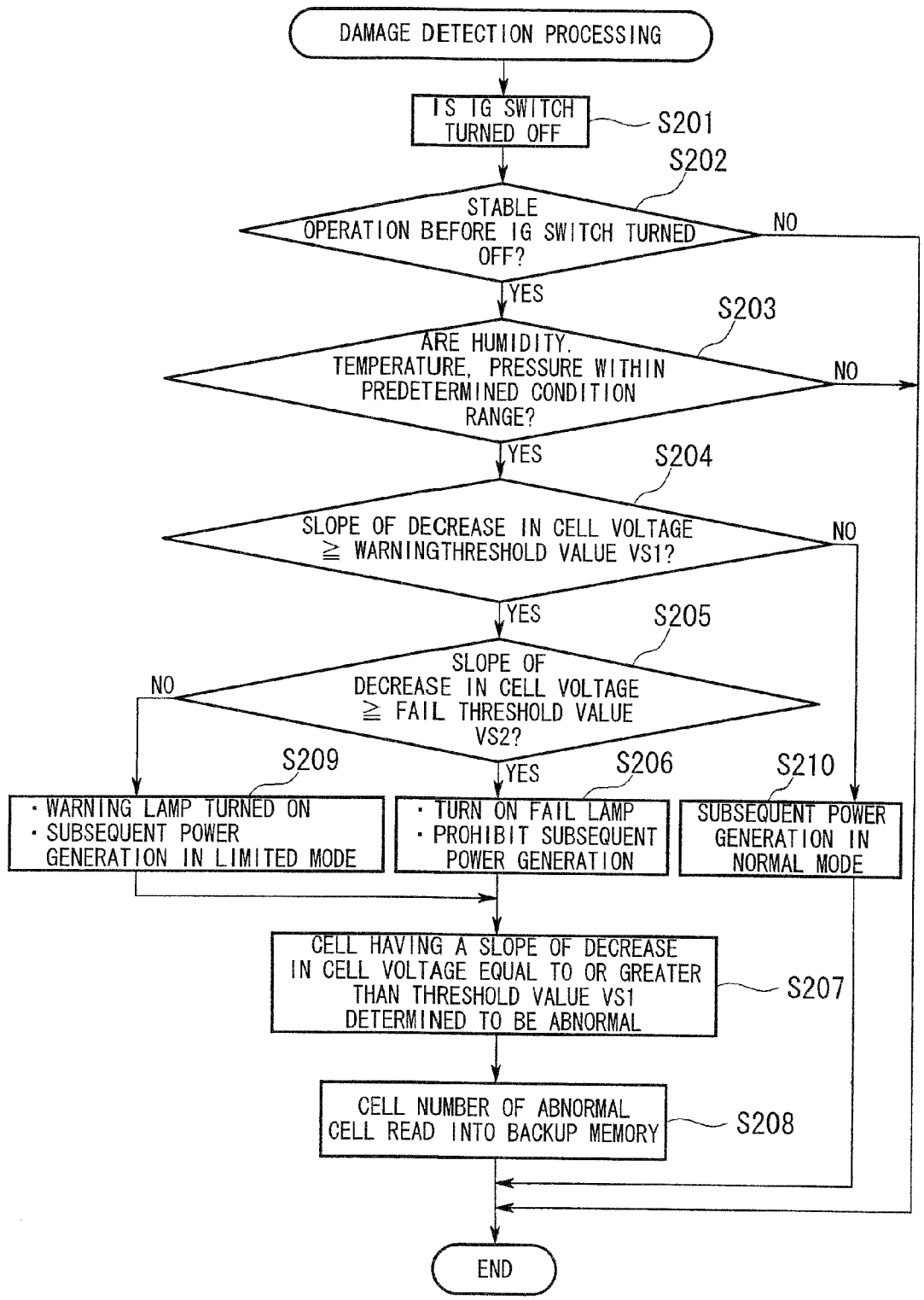
FIG. 8 is a flowchart of the abnormality detecting processing in a second embodiment of the present invention.

Next, a second embodiment of the abnormality detecting method for a fuel cell according to the present invention will be explained with reference to the flowchart in FIG. 8.

In the first embodiment described above, the voltage difference between the average cell voltage and the lowest cell voltage after the passage of a predetermined amount of time from the stoppage of the fuel cell 1 or a reference variation is calculated, and the abnormality determination is carried out by comparing these to a determining threshold value. However, in the second embodiment, the slope of the decrease (that is, the speed of the decrease) of the cell voltages of each of the cells 55 is calculated, and the abnormality determination is carried out by comparing the slope of the decrease to the determining threshold value.

Moreover, the structure of the fuel cell system is identical to that of the first embodiment, and thus the explanation thereof has been eliminated, and only the abnormality detecting method will be explained.

First, the abnormality detecting processing starts using the OFF signal of the ignition (IG) switch serves as the trigger (step S 201).

In addition, in step S 202, it is determined whether or not the fuel cell 1 has been generating power stably (that is, whether or not the reacting gases have been supplied stably) equal to or greater than a predetermined time interval before the ignition switch is turned OFF.

In the case that the result of the determination in step S 202 is NO (the power generation before turning the ignition switch OFF was not stable), the execution of this routine is temporarily stopped. That is, in this case the abnormality detection is not executed. This is because in order to detect abnormalities, when the reacting gases are not stably supplied before the stoppage of the fuel cell 1, the behavior of the cell voltages after the stoppage is unstable, and thus correct abnormality determination cannot be carried out.

Moreover, in this embodiment, the start condition for the abnormality detection processing is the operation of turning OFF the ignition switch by the operator, but if the fuel cell 1 is stably generating power, an idle stop or a forced step for abnormality detection can also be the starting conditions for the abnormality detection processing.

In the case that the result of the determination in step S 202 is YES (the power generation before turning the ignition switch OFF was stable), the processing proceeds to step S 203, and it is determined whether or not the humidity of the reacting gases, the temperature of the fuel cell 1, and the supply pressures of the reacting gases are each within a range of predetermined conditions. In the case that the result of the determination in step S 203 is NO (the conditions are not satisfied), the execution of this routine is temporarily stopped. That is, in this case, the abnormality detection is not executed. The reason for this is that the behavior of the cell voltages after stoppage is unstable when the reacting gases are not stably supplied, and thus correct abnormality determination cannot be carried out.

In the case that the result of the determination in step S 203 is YES (the conditions are satisfied), the execution conditions of the abnormality determination processing are satisfied, and thus the processing proceeds to step S 204, the slope of the decrease of the cell voltages for each of the cells 55 are calculated, and it is determined whether or not the slope of the decrease in the cell voltages of each of the cells 55 is equal to or greater than the warning threshold value VS1.

In the case that the result of the determination in step S 204 is YES (the slope of the decrease in the cell voltages≧VS1), the processing proceeds to step S 205, and it is determined whether or not the slope of the decrease in the cell voltages in the cells that are equal to or greater than the warning threshold value VS1 are equal to or greater than the fail threshold values VS2. Here, the fail threshold value VS2 is set larger than the warning threshold value VS1 (VS2>VS1).

In the case that the result of the determination in step S 205 is YES, (the slope of the decline in the cell voltages is ≧VS2), the degree of the abnormality (deterioration and damage) is large, and thus the fail lamp is turned on, and subsequent power generation is prohibited (step S 206). Furthermore, it is determined that the unit cell 55 with the cell number whose slope of decrease in the cell voltage is equal to or greater than the fail threshold value VS2 (that is, equal to or greater than the warning threshold value VS1) has an abnormality (deterioration and damage) (step S 207), and subsequently this cell number is written in the backup memory of the ECU 20 for reference when repairing (cell change) the fuel cell 1 (step S 208), and the abnormality detection processing ends.

In the case that the result of the determination in step S 205 is NO (the slope of the decrease in the cell voltage<VS2), although abnormalities can be seen in the unit cell 55 whose slope of decrease in cell voltage is equal to or greater than the fail threshold value VS1, the degree of the abnormality (deterioration and damage) is small, and thus the warning lamp is turned on, and subsequent power generation is carried out in an output limited mode (step S 209). The reasons for setting the subsequent power generation to an output limited mode are the same as those for the first embodiment, and serve to suppress the hydrogen leakage during subsequent power generation. Subsequently, it is determined that the unit cell 55 having a cell number whose slope of the decrease in the cell voltage is equal to or greater than the threshold value VS1 is abnormal (step S 207), this cell number is written in the backup memory of the ECU 20 (step S 208), and the abnormality detecting processing ends.

In the case that that result of the determination in step S 204 is NO (the slope of the decrease in the cell voltage<VS1), it is determined that all of the cells 55 are normal, the subsequent power generation is set to normal operation mode (step S 210), and the abnormality detection processing ends.

In this manner, in the second embodiment, abnormalities of the fuel cell 1 are detected based on the speed of the decline of the cell voltages when the supply of the reacting gases has been stopped, and thus the abnormalities of the fuel cell 1 can be detected quickly and accurately (high precision).

In the method of detecting abnormalities in the fuel cell in the second embodiment as well, a fail threshold value VS2 and a warning threshold value VS1 can be set and updated according to the operating state (that is, the pressure difference between the anode and cathode and the degree of humidity of the reaction gases) of the fuel cell 1 before stoppage, and thereby is preferable because the determination procession can be increased.

Third Embodiment

Next, the third embodiment of the method of detecting abnormalities in a fuel cell according to the present invention will be explained.

As described above, when an abnormal fuel cell is present in the fuel cell 1, as shown in FIG. 4, the distribution of the cell voltages after the passage of a predetermined time interval from the stoppage of the fuel cell 1 is lowest for cell voltages of the $nx^{th}$ unit cell 55 having the abnormality, and centered on this, an approximately V-shaped distribution part Y occurs.

Here, we will conjecture the reasons that an approximately V-shaped distribution part Y occurs. As described above, the fuel cell 1 is formed by stacking a plurality of cells 55. The fuel cell 1 provides hydrogen supply through holes, hydrogen discharge through holes, air supply through holes, and air discharge through holes that are formed by passing through all cells 55. The hydrogen gas is distributed and supplied in parallel to the hydrogen gas duct 56 of each of the cells 55 from the hydrogen supply through holes, the unreacted hydrogen from the hydrogen gas duct 56 of each of the cells 55 collects in the hydrogen discharge through holes and is discharged, the air is distributed and supplied in parallel to the air duct 57 of each of the cells 55 from the air supply through holes, and the unreacted air from the air ducts 57 of each of the cells 55 gathers in the air discharge through holes and is discharged. That is, the hydrogen gas duct 56 of each of the cells 55 is joined by the hydrogen supply through holes and the hydrogen discharge through holes, and the air ducts 57 of each of the cells 55 are connected by the air supply through holes and the air discharge through holes. Thereby, when the fuel cell 1 is stopped and the flow of the reacting gases is stopped, the hydrogen gas leaks into the air duct 57 from the hydrogen gas duct 56 of the $nx^{th}$ unit cell 55 that has an abnormality. When this happens, this hydrogen gas flows into the air duct 57 of the adjacent normal unit cell 55 by passing through the air discharge through holes, and thereby the speed of the decrease of the cell pressure of the adjacent normal unit cell 55 increases. It is further conjectured that the closer the position of the unit cell 55 is to an abnormal cell, the larger the influence, and thus an approximately V-shaped distribution part Y occurs.

Therefore, in the case that the abnormality detection processing of the first embodiment or the second embodiment described above is executed, not only is it determined that the $nx^{th}$ unit cell 55 is abnormal, but there is a concern that a normal unit cell 55 that has been influenced because it is positioned in proximity to this abnormal unit cell 55 will also be mistakenly determined to be abnormal.

The abnormality detection processing in the third embodiment is designed so as to avoid this type of mistaken determination. When an approximately V-shaped distribution part Y is present in the distribution of the cell voltages of all cells, only the cell that acts as the peak of the mountain in the approximately Y-shaped distribution part Y, that is, only the unit cell 55 that shows the lowest cell voltage, is determined to be abnormal. Thereby, it is possible to prevent mistakenly determining a normal cell whose abnormal cell voltage originates in the influence in an abnormal cell to be an abnormal cell.

Figure 9:
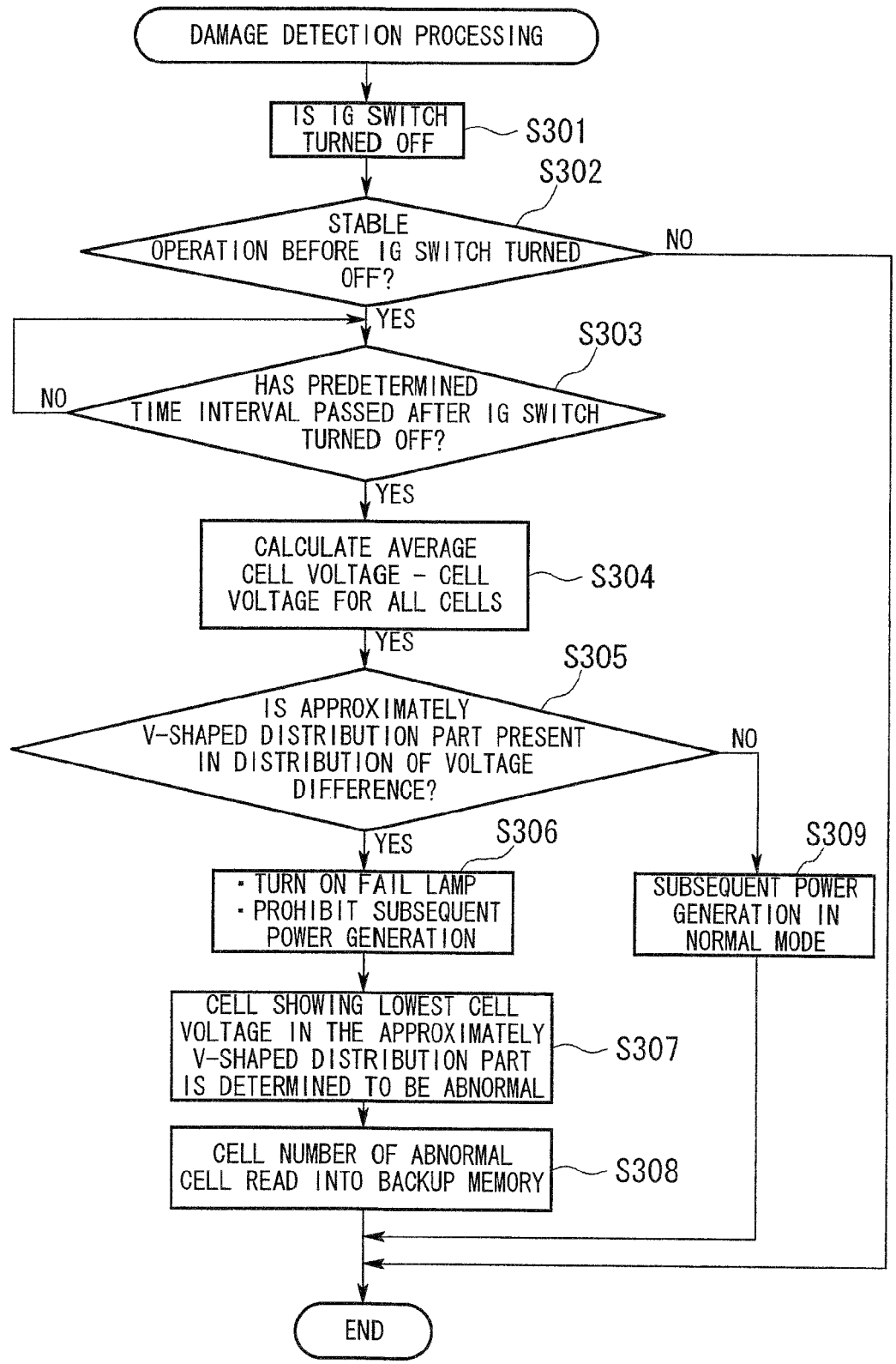
FIG. 9 is a flowchart of the abnormality detecting processing in a third embodiment of the present invention.

Next, the abnormality detection processing for a fuel cell in the third embodiment will be explained with reference to the flowchart in FIG. 9.

First, the abnormality determination processing is started using as a trigger the OFF signal of the ignition (IG) switch (step S 301).

In addition, in step S 302, it is determined whether or not the fuel cell 1 is stably generating power (that is to say, whether or not reacting gases are being stably supplied) for a predetermined time interval or greater before the ignition switch is turned OFF.

In the case that the result of the determination in step S 302 is NO (power generation was not stable before turning OFF the ignition switch), the execution of the present routine temporarily ends. That is, in this case, the abnormality detection is not executed. The reason for this is that, in order to carry out abnormality detection, when the reacting gases are not stably supplied before the stoppage of the fuel cells 1, the behavior of the cell voltages after stoppage is unstable, and thus correct abnormality detection is not possible.

Moreover, in this embodiment, the start condition for the abnormality detection processing is the operation of turning OFF of the ignition switch by the driver, but if the fuel cells 1 is stably generating power, the idle stop or the forced stop for abnormality determination can serve as the start condition for the abnormality detection processing.

In the case that the result of the determination in step S 302 is YES (power generation was stable before turning OFF the ignition switch), the processing proceeds to step S 303, and it is determined whether or not a predetermined time (for example 10 seconds) has passed after the ignition switch is turned OFF. In the case that the result of the determination in step S 303 is NO (the predetermined time interval has not passed), the processing returns again to step S 303. The reason is that if a predetermined time interval has not passed, the cell voltage difference between the abnormal cells 55 and the normal cells 55 is small, and thereby the precision of the determination deteriorates.

In the case that the result of the determination in step S 303 is YES (after the passage of a predetermined time interval), the processing proceeds to step S 304, the cell voltage of each of the cells 55 are read, the average value of the cell voltages (below, referred to as "average cell voltage") is calculated, and the difference (voltage difference), which is the voltage of each of the cells subtracted from the average cell voltage for all cells 55, is found.

Then the processing proceeds to step S 305, a voltage difference distribution that arranges the voltage differences between each of the cells 55 is arranged in the order of the disposition of the cells 55, and it is determined whether or not an approximately V-shaped distribution part Y is present in this voltage difference distribution. In the case that the result of the determination in step S 305 is YES (an approximately V-shaped distribution part Y is present) an abnormal cell is present, and thus the fail lamp is turned on, and subsequent power generation is prohibited (step S 306).

Furthermore, it is determined that there is an abnormality (deterioration and damage) in the unit cell 55 having the cell number detected to have the lowest cell voltage in the approximately V-shaped distribution part Y (step S 307), subsequently the cell number is written into the backup memory of the ECU 20 for reference when repairing (cell change) the fuel cell 1 (step S 308), and the abnormality determination processing ends.

In contrast, in the case that the result of the determination in step S 305 is NO (an approximately V-shaped distribution part Y is not present), it is determined that all cells 55 are normal, the subsequent power generation is set to the normal operating mode (step S 309), and the abnormality detection processing is ended.

In this manner, in the third embodiment, the abnormality is detected based on the distribution of the cell voltage of each of the cells while the supply of the reaction gases is stopped, and thus an abnormality of the fuel cell 1 can be detected quickly and correctly. Furthermore, it is determined that there is an abnormality in the cell that shows the lowest cell voltage in the approximately V-shaped distribution part Y, and thus, not only can the cell that has the abnormality can be indicated, but mistakenly determining a normal cell to be abnormal can be prevented.

Moreover, the abnormality determining processing of the third embodiment can be processed in parallel with the abnormality determining processing of the second embodiment. Thereby, the precision of the determination is improved.

Other Embodiments

Moreover, the invention is not limited by the embodiments described above. For example, the fuel cell that is the object of application of the abnormality detecting method of the present invention is not limited to a solid polymer electrolyte membrane-type fuel cell, and the invention can be applied to fuel cells having other forms as well.

As has been explained above, according to one aspect of the invention, an abnormality in a fuel cell is detected based on the cell voltages after a predetermined time interval from the stoppage of the fuel cell, and thus the precision of the determination becomes higher and the determination time interval becomes shorter. Therefore, there is the superior effect that the abnormality in the fuel cell can be detected quickly. In addition, according to the first aspect of the invention, there is the effect that the cell having the abnormality can be indicated.

According to another aspect of the invention, an abnormality in the fuel cell is detected based on the speed in the decrease of each of the cell voltages after stoppage of the fuel cell, and thus the precision of the determination becomes higher and the determination time interval becomes shorter. Therefore, there is the superior effect that the abnormality in the fuel cell can be detected quickly. In addition, according to the second aspect of the invention, there is the effect that the cell having the abnormality can be indicated.

According to another one aspect of the invention, the determination threshold value that indicates whether or not there is an abnormality is set depending on the operational state of the fuel cell, and thus the precision of the determination becomes higher.

According to a yet another one aspect of the invention, the abnormality of the fuel cell is determined based on the distribution of each of the cell voltages after stoppage of the fuel cell. Therefore, there is the superior effect that the abnormality in the fuel cell can be detected quickly. In addition, according to the fourth aspect of the invention, there is the effect that the cell having the abnormality can be indicated.

According to a still another one aspect of the invention, the abnormality detection is executed in the case that the fuel cell is stably operating before the fuel cell stoppage, and thus there is the effect that mistaken determinations can be prevented.

According to the other aspect of the invention, there is the effect that the amount of leakage of reacting gases during subsequent power generation can be decreased.

What is claimed is:

1. An abnormality detecting method for a fuel cell stack comprising a plurality of unit cells that generate power by supplying reaction gases to an anode and a cathode of each unit cell, the method comprising:
   stopping supply of the reaction gases to the fuel cell stack;
   determining a speed of cell voltage decrease of each of the unit cells after stopping supply of the reaction gases;
   determining that the fuel cell stack is abnormal when the speed of cell voltage decrease of any of the unit cells exceeds a warning value set for determination of abnormality of said fuel cell;
   when an abnormality of the fuel cell stack is detected, operating the fuel cell stack in an output limiting mode during a subsequent power generation by limiting the operational pressure of the reaction gases to a level lower than before the abnormality is detected; and
   determining a pressure difference between the anode and the cathode before stopping supply of the reaction gases,
   wherein the warning value is increased as the pressure difference is increased.

2. An abnormality detecting method for a fuel cell stack comprising a plurality of unit cells that generate power by supplying reaction gases to an anode and a cathode of each unit cell, the method comprising:
   stopping supply of the reaction gases to the fuel cell stack;
   determining a speed of cell voltage decrease of each of the unit cells after stopping supply of the reaction gases;
   determining that the fuel cell stack is abnormal when the speed of cell voltage decrease of any of the unit cells exceeds a warning value set for determination of abnormality of said fuel cell;
   when an abnormality of the fuel cell stack is detected, operating the fuel cell stack in an output limiting mode during a subsequent power generation by limiting the operational pressure of the reaction gases to a level lower than before the abnormality is detected; and
   determining a degree of humidity of the reaction gases before stopping supply of the reaction gases,
   wherein the warning value is increased as the degree of humidity is increased.

3. An abnormality detecting method for a fuel cell stack comprising a plurality of unit cells that generates power by supplying reaction gases, the method comprising:
   stopping supply of the reaction gases to the fuel cell stack;
   reading a cell voltage of each of the unit cells after stopping supply of the reaction gases and calculating an average cell voltage;
   determining a unit cell having a lowest cell voltage and calculating a voltage difference between the lowest cell voltage and the average cell voltage;
   determining that the unit cell is failed when the voltage difference is larger than a fail value, the fail value being set so as to be used for determining an abnormality of said fuel cell;
   determining that the unit cell is abnormal when the voltage difference is in between the fail value and a warning value, wherein the fail value is greater than the warning value;
   determining that all unit cells of the fuel cell stack are normal when the voltage difference is smaller than the warning value; and
   determining a pressure difference between the anode and the cathode before stopping supply of the reaction gases,
   wherein the fail value and the warning value are increased as the pressure difference is increased.

4. An abnormality detecting method according to claim 3, further comprising:
   prohibiting further operation of the fuel cell stack, when it is determined that the fuel cell stack is failed;
   operating the fuel cell stack in an output limiting mode by limiting the operating pressure of the reaction gases to a level lower than before the abnormality is detected, when it is determined that the fuel cell stack is abnormal; and
   operating the fuel cell stack normally when it is determined that the fuel cell stack is normal because the voltage difference between the average cell voltage and the lowest cell voltage is smaller than the warning value.

5. An abnormality detecting method according to claim 3, wherein the step of reading the cell voltage of each of the unit cells comprises:
  reading the cell voltage of each of the cells after a predetermined time interval has passed from stopping the supply of the reaction gases, wherein a difference in cell voltages between an abnormal unit cell and a normal unit cell becomes sufficiently large during the predetermined time interval, and calculating an average of the cell voltages of all of the cells.

6. An abnormality detecting method for a fuel cell stack comprising a plurality of unit cells that generates power by supplying reaction gases, the method comprising:
  stopping supply of the reaction gases to the fuel cell stack;
  reading a cell voltage of each of the unit cells after stopping supply of the reaction gases and calculating an average cell voltage;
  determining a unit cell having a lowest cell voltage and calculating a voltage difference between the lowest cell voltage and the average cell voltage;
  determining that the unit cell is failed when the voltage difference is larger than a fail value, the fail value being set so as to be used for determining an abnormality of said fuel cell;
  determining that the unit cell is abnormal when the voltage difference is in between the fail value and a warning value, wherein the fail value is greater than the warning value;
  determining that all unit cells of the fuel cell stack are normal when the voltage difference is smaller than the warning value; and
  determining a degree of humidity of the reaction gases before stopping supply of the reaction gases,
  wherein the fail value and the warning value are increased as the degree of humidity is increased.

7. An abnormality detecting method for a fuel cell stack comprising a plurality of unit cells that generate power by supplying reaction gases to an anode and a cathode of each unit cell, the method comprising:
  stopping supply of the reaction gases to the fuel cell stack;
  determining a slope of a decrease in a voltage of each cell unit after stopping supply of the reaction gases;
  setting a predetermined fail determination threshold value for determining that the fuel cell is abnormal;
  setting a warning threshold value that is different from the fail determination threshold value and is smaller than the fail determination threshold value;
  determining that the fuel cell stack is failed when the slope of the decrease of the voltage of a unit cell is greater than the fail determination threshold value;
  determining that the fuel cell stack is abnormal when the slope of the decrease of the voltage of the unit cell is between the fail determination threshold value and the warning threshold value;
  determining that the fuel cell stack is normal when the slope of the decrease of the voltage of the unit cell is smaller than the warning threshold value; and
  determining a pressure difference between the anode and the cathode before stopping supply of the reaction gases,
  wherein the fail determination threshold value and the warning threshold value are increased as the pressure difference is increased.

8. An abnormality detecting method according to claim 7, further comprising
  prohibiting an operation of the fuel cell stack when it is determined that the fuel cell stack has failed;
  operating the fuel cell stack in a limited mode in which the supply of the reaction gases is limited when it is determined that the fuel cell stack is abnormal; and
  operating the fuel cell stack in a normal mode when the slope of the decrease in the cell voltage is smaller than the warning threshold value.

9. An abnormality detecting method for a fuel cell stack comprising a plurality of unit cells that generate power by supplying reaction gases to an anode and a cathode of each unit cell, the method comprising:
  stopping supply of the reaction gases to the fuel cell stack;
  determining a slope of a decrease in a voltage of each cell unit after stopping supply of the reaction gases;
  setting a predetermined fail determination threshold value for determining that the fuel cell is abnormal;
  setting a warning threshold value that is different from the warning threshold value and is smaller than the fail determination threshold value;
  determining that the fuel cell stack is failed when the slope of the decrease of the voltage of a unit cell is greater than the fail determination threshold value;
  determining that the fuel cell stack is abnormal the slope of the decrease of the voltage of the unit cell is between the fail determination threshold value and the warning threshold value;
  determining that the fuel cell stack is normal when the slope of the decrease of the voltage of the unit cell is smaller than the warning threshold value; and
  determining a degree of humidity of the reaction gases before stopping supply of the reaction gases,
  wherein the fail determination threshold value and the warning threshold value are increased as the degree of humidity is increased.

10. An abnormality detecting method according to claim 9, further comprising:
  prohibiting an operation of the fuel cell stack when it is determined that the fuel cell stack has failed;
  operating the fuel cell stack in a limited mode in which the supply of the reaction gases is limited when it is determined that the fuel cell stack is abnormal; and
  operating the fuel cell stack in a normal mode when the slope of the decrease in the cell voltage is smaller than the warning threshold value.

11. An abnormality detecting method according to claim 6, further comprising:
  prohibiting further operation of the fuel cell stack, when it is determined that the fuel cell stack is failed;
  operating the fuel cell stack in an output limiting mode by limiting the operating pressure of the reaction gases to a level lower than before the abnormality is detected, when it is determined that the fuel cell stack is abnormal; and
  operating the fuel cell stack normally when it is determined that the fuel cell stack is normal because the voltage difference between the average cell voltage and the lowest cell voltage is smaller than the warning value.

12. An abnormality detecting method according to claim 6, wherein the step of reading the cell voltage of each of the unit cells comprises:
  reading the cell voltage of each of the cells after a predetermined time interval has passed from stopping the supply of the reaction gases, wherein a difference in cell voltages between an abnormal unit cell and a normal unit cell becomes sufficiently large during the predetermined time interval, and calculating an average of the cell voltages of all of the cells.

* * * * *